(12) United States Patent
Nakano et al.

(10) Patent No.: US 10,393,411 B2
(45) Date of Patent: Aug. 27, 2019

(54) STIRLING CRYOCOOLER

(71) Applicant: SUMITOMO HEAVY INDUSTRIES, LTD., Tokyo (JP)

(72) Inventors: Kyosuke Nakano, Nishitokyo (JP); Yoshikatsu Hiratsuka, Nishitokyo (JP); Kenta Yumoto, Nishitokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 260 days.

(21) Appl. No.: 15/005,811

(22) Filed: Jan. 25, 2016

(65) Prior Publication Data

US 2016/0223227 A1    Aug. 4, 2016

(30) Foreign Application Priority Data

Jan. 29, 2015   (JP) .................. 2015-015718

(51) Int. Cl.
*F25B 9/14* (2006.01)
*F16J 1/02* (2006.01)
*F02G 1/053* (2006.01)

(52) U.S. Cl.
CPC ............ *F25B 9/14* (2013.01); *F02G 1/053* (2013.01); *F16J 1/02* (2013.01); *F25B 2309/003* (2013.01)

(58) Field of Classification Search
CPC ....... F25B 9/14; F16J 1/02; F16J 1/005; F16J 1/08; F16J 1/09; F02G 1/053
See application file for complete search history.

(56) References Cited

U.S. PATENT DOCUMENTS 4,345,437 A * 8/1982 Dineen ................ F02G 1/0435
                                                60/520

FOREIGN PATENT DOCUMENTS

| JP | H05-248719 A | 9/1993 |
| JP | 2000-121187 A | 4/2000 |
| JP | 2004-233004 A | 8/2004 |
| JP | 2007-285661 A | 11/2007 |
| JP | 2008-231949 A | 10/2008 |
| JP | 2014-057938 A | 4/2014 |

OTHER PUBLICATIONS

Translation of JP 2007-285661.*

* cited by examiner

*Primary Examiner* — John F Pettitt, III
(74) *Attorney, Agent, or Firm* — HEA Law PLLC

(57) ABSTRACT

A Stirling cryocooler includes a displacer having a displacer base portion disposed on a center axis and a displacer tip portion aligned along the center axis, extending from the displacer base portion to a working-gas expansion space, and a regenerator disposed surrounding the displacer tip portion such as to guide reciprocating travel of the displacer along the center axis. The displacer tip portion includes a plurality of platelike components arranged along the center axis, with each of the plurality of platelike components being furnished with a component side surface defining a portion of the outer surface of the displacer tip portion. The plurality of platelike components form working gas layers between pairs of adjoining components, and/or are formed of a synthetic resin material.

10 Claims, 3 Drawing Sheets

STIRLING CRYOCOOLER

RELATED APPLICATIONS

Priority is claimed to Japanese Patent Application No. 2015-015718, filed Jan. 29, 2015, the entire content of which is incorporated herein by reference.

BACKGROUND

Technical Field

Certain embodiments of the invention relate to a Stirling cryocooler, and particularly, to an expander of a Stirling cryocooler.

Description of Related Art

A displacer is provided in an expander of a Stirling cryocooler. One end of the displacer is disposed on a "low temperature" portion of the expander, and the other end is disposed on a "normal temperature" portion thereof. Accordingly, a temperature gradient is produced in the displacer when the cryocooler is used. Consequently, via the displacer heat from the normal temperature portion invades the low temperature portion. Heat having intruded this way decreases the refrigerating capacity of the Stirling cryocooler.

SUMMARY

According to an aspect of the present invention, there is provided a Stirling cryocooler, including: a displacer that includes a displacer base portion disposed on a center axis and a displacer tip portion aligned along the center axis, extending from the displacer base portion to a working-gas expansion space; and a regenerator disposed surrounding the displacer tip portion such as to guide reciprocating travel of the displacer along the center axis. The displacer tip portion includes a plurality of platelike components arranged along the center axis, each of the plurality of platelike components being furnished with a component side surface defining a portion of the outer surface of the displacer tip portion. The plurality of platelike components are arranged to form working gas layers between each of where two of the platelike components are adjacent to each other.

According to another aspect of the present invention, there is provided a Stirling cryocooler, including: a displacer that includes a displacer base portion disposed on a center axis and a displacer tip portion aligned along the center axis, extending from the displacer base portion to a working-gas expansion space; and a regenerator disposed surrounding the displacer tip portion such as to guide reciprocating travel of the displacer along the center axis. The displacer tip portion includes a plurality of platelike components arranged along the center axis, each of the plurality of platelike components being furnished with a component side surface defining a portion of the outer surface of the displacer tip portion. The plurality of platelike components are formed of a synthetic resin material.

DETAILED DESCRIPTION

Figure 1:
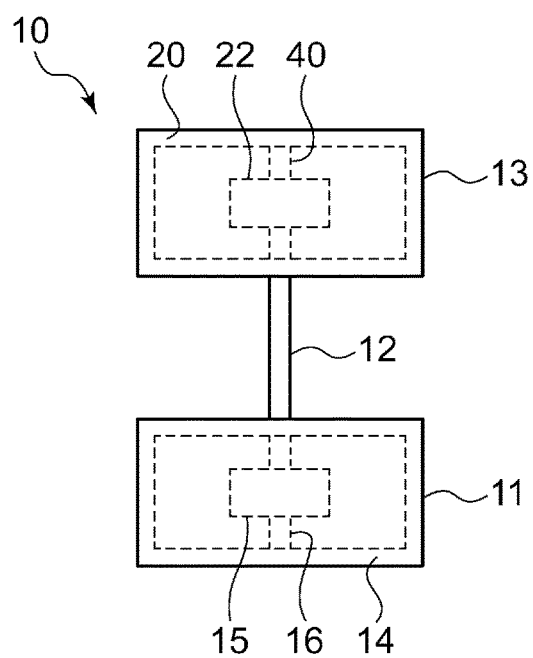
FIG. 1 is a view schematically showing a Stirling cryocooler according to an embodiment of the present invention.

It is desirable to decrease heat transmitted through a displacer in an expander of a Stirling cryocooler.

In addition, certain embodiments of the invention include arbitrary combinations of the above-described components, or components or expressions of the present invention that may be interchangeable with each other between methods, devices, systems, or the like.

According to certain embodiments of the invention, it is possible to decrease heat transmitted through the displacer in the expander of the Stirling cryocooler.

Hereinafter, certain embodiments of the invention will be described in detail with reference to the drawings. In addition, in descriptions thereof, the same reference numerals are assigned to the same elements, and overlapping descriptions are appropriately omitted. In addition, configurations described below are exemplified, and do not limit a scope of the present invention.

FIG. 1 is a view schematically showing a Stirling cryocooler 10 according to an embodiment of the present invention. The Stirling cryocooler 10 includes a compressor 11, a connection pipe 12, and an expander 13.

The compressor 11 includes a compressor case 14. The compressor case 14 is a pressure vessel, which is configured so as to hold a high-pressure working gas in an airtight manner. For example, the high-pressure working gas is helium gas. In addition, the compressor 11 includes a compressor unit, which is accommodated in the compressor case 14. The compressor unit includes a compressor piston and a compressor cylinder. The compressor piston or the compressor cylinder can be either a movable member 15, which is configured so as to reciprocate in the compressor case 14; the other is a stationary member, which is fixed to the compressor case 14. The compressor unit includes a drive source for driving the movable member 15, with respect to the compressor case 14, in the axial direction along the center axis of the movable member 15. The compressor 11 includes a support portion 16, which supports the movable member 15 in the compressor case 14 such that the movable member 15 can reciprocate movement. The movable member 15 vibrates, with respect to the compressor case 14 and the stationary member, at certain amplitude and a frequency. As a result, working gas pressure inside the compressor 11 is changed by specific amplitude and a specific frequency.

A working gas chamber is formed between the compressor piston and the compressor cylinder. The working gas chamber is connected to one end of the connection pipe 12 via communication passages, which are formed in the above-described stationary member and the compressor case 14. The other end of the connection pipe 12 is a working gas chamber of the expander 13. Accordingly, the working gas chamber of the compressor 11 and the working gas chamber of the expander 13 are connected to each other by the connection pipe 12.

As described below with reference to FIG. 2, the expander 13 includes an expander main body 20, a displacer 22, and at least one support portion 40.

Figure 2:
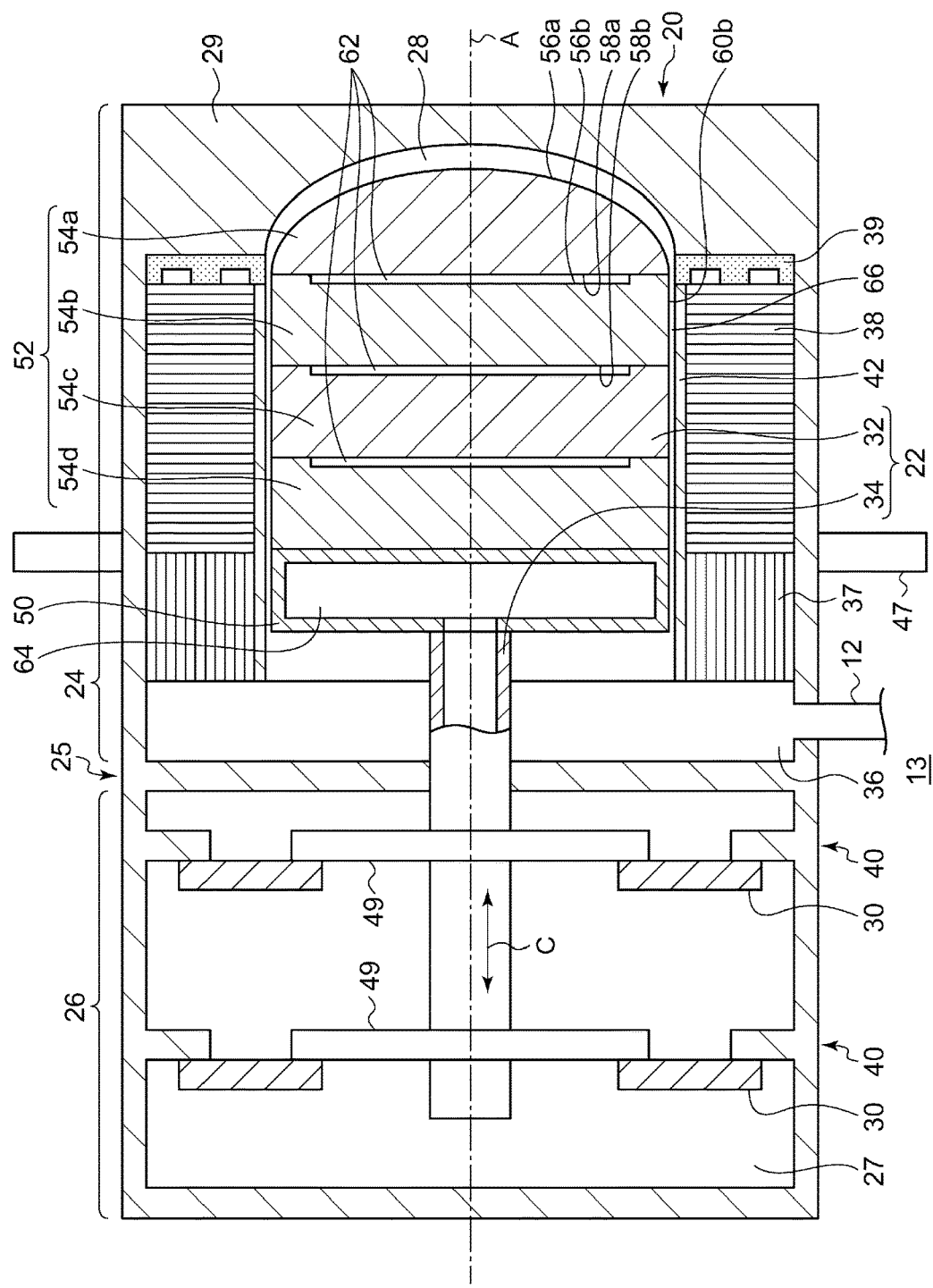
FIG. 2 is a sectional view schematically showing an expander of the Stirling cryocooler according to an embodiment of the present invention.

FIG. 2 is a view schematically showing the expander 13 according to the embodiment of the present invention. FIG. 2 schematically shows an inner structure of the expander 13.

The expander main body 20 is a pressure vessel, which is configured so as to hold a high-pressure working gas in an airtight manner. The pressure vessel may be configured with a plurality of vessel portions that are connected to each other so as to hold the inner portion of the pressure vessel in an airtight manner. The displacer 22 is a movable member, which is configured so as to reciprocate movement in the expander main body 20. The support portion 40 supports the displacer 22 to the expander main body 20 such that the displacer 22 can reciprocate movement.

The expander main body 20 includes a first section 24 and a second section 26. The first section 24 is an expansion space 28 of working gas that is formed between the expander main body 20 and the displacer 22. A cooling stage 29 for cooling an object is provided on the portion of the expander main body 20 adjacent to the expansion space 28. The second section 26 is configured so as to support the displacer 22 to the expander main body 20 via elastic members 30.

In the expander main body 20, a portion of the first section 24 side is accommodated in a vacuum vessel (not shown). A vacuum layer inside the vacuum vessel and an atmospheric layer outside the vacuum vessel are separated from each other by a flange 47.

The second section 26 is adjacent to the first section 24, in a reciprocating direction (shown by arrow C in FIG. 1) of the displacer 22. A seal portion 25 is provided between first section 24 and the second section 26. Accordingly, the second section 26 is partitioned from the first section 24. Accordingly, pressure variation of the working gas in the first section 24 is not transmitted to the second section 26 and/or does not substantially influence the pressure of the working gas in the second section 26. In addition, the same kind of gas as the working gas is sealed in the second section 26 such that the second section 26 has the same pressure as an average pressure of the working gas fed from the compressor 11. Accordingly, the second section 26 forms an average pressure chamber 27 in the inner portion of the second section 26.

The displacer 22 includes a displacer head 32, which is accommodated in the first section 24, and a displacer rod 34, which extends from the displacer head 32 to the second section 26 through the seal portion 25. The displacer rod 34 is a shaft portion that is thinner than the displacer head 32. The displacer 22 has a center axis (shown by a chain line A in FIG. 1) that is parallel to the reciprocal direction, and the displacer head 32 and the displacer rod 34 are coaxially provided in the center axis of the displacer 22.

The displacer rod 34 is supported by the expander main body 20 in the second section 26 such that the displacer 22 can reciprocate movement. For example, the above-described seal portion 25 may be a rod seal that is formed between the displacer rod 34 and the expander main body 20.

The first section 24 forms a cylinder portion 42 that surrounds the displacer head 32. The expansion space 28 is formed between a bottom surface (that is, an inner surface of the cooling stage 29) of the cylinder portion 42 and a tip surface of the displacer head 32. The expansion space 28 is formed on a side opposite to a joining portion between the displacer head 32 and the displacer rod 34 in the reciprocal direction of the displacer 22. A gas space 36 serving as a compression space of the working gas in the expander 13 is formed between the joining portion and the seal portion 25. As described above, the gas space 36 is connected to the connection pipe 12.

In the expander 13, the expander main body 20 supports the displacer 22 at a plurality of different positions in the reciprocal direction of the displacer 22 such that the displacer 22 can reciprocate movement. Accordingly, the expander 13 includes two support portions 40. The two support portions 40 are provided in the second section 26. Therefore, it is possible to prevent tilting of the displacer 22 with respect to the center axis.

The support portion 40 includes the above-described elastic member 30. The elastic member 30 is disposed between the displacer rod 34 and the expander main body 20 such that an elastic restoring force is applied to the displacer 22 when the displacer 22 is displaced from a neutral position. Accordingly, the displacer 22 reciprocates movement at a natural frequency, which is determined from an elastic coefficient of the elastic member 30, an elastic coefficient due to the pressure of the working gas, and the weight of the displacer 22.

For example, the elastic member 30 has a spring mechanism that includes at least one plate spring. The plate spring is a spring referred to as a flexure spring, and the plate spring is flexible in the reciprocal direction of the displacer 22 and is rigid in a direction perpendicular to the reciprocal direction. Therefore, the elastic member 30 allows the axial movement of the displacer 22 along the direction along the center axis. The elastic member, however, regulates the movement of the displacer 22 in the radial direction, orthogonal to the center axis. The displacer rod 34 is fixed to the elastic member 30 via an elastic member attachment portion 49.

Through the aforementioned, a vibration system, including the displacer 22 and the elastic member 30, is configured. The vibration system is configured such that the displacer 22 vibrates so as to have the vibration and the phase difference at the same frequency as the vibration of the movable member 15 of the compressor 11.

The displacer head 32 includes a displacer base portion 50 and a displacer tip portion 52. The displacer base portion 50 is axially disposed on the center axis of the displacer 22. The displacer tip portion 52 extends from the displacer base portion 50 to the expansion space 28 of the working gas along the center axis of the displacer 22. The end portion of the displacer rod 34 is attached to the center of the displacer base portion 50.

The displacer base portion 50 is a cylindrical hollow member that extends along the center axis of the displacer 22. The displacer rod 34 is fixed to a rear surface of the displacer base portion 50. A cavity 64 is formed inside the displacer base portion 50. The cavity 64 is sealed in an airtight manner from the gas space 36. For example, the displacer base portion 50 is formed of a metal material.

The displacer rod 34 is a hollow tube in which both ends are opened. In the inner space of the displacer rod 34, one end of the displacer rod 34 communicates with the cavity 64 of the displacer base portion 50, and the other end communicates with the average pressure chamber 27. Accordingly, the cavity 64 of the displacer base portion 50 has the average pressure similar to the inner portion of the second section 26. For example, the displacer rod 34 is formed of a metal material.

A regenerator 38 is provided in the expander main body 20. The regenerator 38 is disposed around the displacer tip portion 52 so as to guide the reciprocation of the displacer 22 in the axial direction. The regenerator 38 includes a regenerator material vessel, which is a portion of the expander main body 20, and a regenerator material, which is accommodated in the regenerator material vessel. The regenerator material vessel is an annular or doughnut-shaped vessel that extends in the axial direction so as to be coaxial with the displacer 22, and forms an accommodation space of the regenerator material. The inner tube of the regenerator material vessel functions as the cylinder portion 42. For example, the regenerator material has a laminated structure of wire meshes. The regenerator 38 allows the working gas to flow between the gas space 36 and the expansion space 28.

A water cooling type heat exchanger 37 can be provided so as to be adjacent to the regenerator 38 between the regenerator 38 and the gas space 36 in the axial direction. Similar to the regenerator 38, the water cooling type heat exchanger 37 is also formed in an annular shape or a doughnut shape. Similar to the regenerator 38, an inner wall portion of the water cooling type heat exchanger 37 functions as the cylinder portion 42.

The water cooling type heat exchanger 37 cools the working gas supplied from the compressor 11 and realizes heat exchange for discharging the heat from the working gas to the outside of the expander 13. In general, since the working gas that is supplied from the compressor 11 to the gas space 36 has a higher temperature than the room temperature, the water cooling type heat exchanger 37 cools the high temperature gas so as to be the room temperature.

The water cooling type heat exchange 37 is disposed around the displacer base portion 50. The side surface of the displacer base portion 50 can slide with respect to the inner wall portion of the water cooling type heat exchanger 37. Accordingly, the water cooling type heat exchanger 37 can guide the reciprocation of movement of the displacer head 32 in the axial direction. The seal portion interfering with the flow of the working gas between the gas space 36 and the expansion space 28 may be formed between the side surface of the displacer base portion 50 and the inner wall portion of the water cooling type heat exchanger 37.

In addition, a low temperature heat exchanger 39 is attached so as to be adjacent in the axial direction to the regenerator 38 between the regenerator 38 and the cooling stage 29. The low temperature heat exchanger 39 is disposed around the displacer tip portion 52. A working gas flow passage, which connects the gas space 36 and the expansion space 28, is formed by the water cooling type heat exchanger 37, the regenerator 38, and the low temperature heat exchanger 39.

The flange 47 is provided at a position in the axial direction corresponding to the boundary between the regenerator 38 and the water cooling type heat exchanger 37. That is, the flange 47 forms a boundary between a normal temperature portion and a low temperature portion of the Stirling cryocooler 10. A portion of the first section 24, specifically, the gas space 36 and the water cooling type heat exchanger 37, are provided in the normal temperature portion of the Stirling cryocooler 10. The seal portion 25 and the second section 26 are also provided in the normal temperature portion of the Stirling cryocooler 10. Remaining portions of the first section 24, specifically, the regenerator 38, the low temperature heat exchanger 39, the expansion space 28, and the cooling stage 29 are provided in the low temperature portion of the Stirling cryocooler 10.

In addition, the displacer rod 34 and the displacer base portion 50 are provided in the normal temperature portion of the Stirling cryocooler 10. The displacer tip portion 52 is provided in the low temperature portion of the Stirling cryocooler 10.

The displacer 22 is driven by pulsation of a working gas pressure generated by the vibration of the movable member 15 of the compressor 11. A reverse Stirling cycle is formed between the expansion space 28 and the working gas chamber of the compressor 11 by reciprocation of movement of the displacer 22 and the movable member 15 of the compressor 11. Accordingly, the low temperature heat exchanger 39 adjacent to the expansion space 28 is cooled. The cooling stage 29 is cooled by the low temperature heat exchanger 39, and the object can be cooled by the Stirling cryocooler 10.

The cold, which is generated in the expansion space 28, is accumulated in the regenerator 38. While a boundary region between the low temperature heat exchanger 39 and the regenerator 38 is cooled so as to be the lowest temperature, a boundary region between the water cooling type heat exchanger 37 and the regenerator 38 has the room temperature. Accordingly, a temperature gradient is generated in the axial direction in the regenerator 38. As described above, the regenerator 38 surrounds the displacer tip portion 52 so as to guide the reciprocation in the axial direction of the displacer 22. Accordingly, similar to the regenerator 38, a temperature gradient is also generated in the axial direction in the displacer tip portion 52.

Hereinafter, for convenience of description, the side close to the expansion space 28 in the regenerator 38 and the displacer head 32 is referred to as a "low temperature side". The side close to the gas space 36 in the regenerator 38 and the displacer head 32 is referred to as a "high temperature side".

The displacer tip portion 52 is formed of a plurality of platelike components, which are arranged in the axial direction. The plurality of platelike components are arranged such that a working gas layer 62 is formed between two platelike component adjacent to each other. Each of the plurality of platelike components has a component side surface, which defines a portion of the outer surface of the displacer tip portion 52.

The plurality of platelike components include a first platelike component 54a that faces the expansion space 28, and at least one intermediate platelike component that connects the first platelike component 54a to the displacer base portion 50. In the embodiment shown in FIG. 2, the displacer tip portion 52 includes three intermediate platelike components. Accordingly, the displacer tip portion 52 includes four platelike components.

The first platelike component 54a is a solid member which has a hemispherical shape or a semi-ellipsoidal sphere shape. The outer shape of the first platelike component 54a is defined by a first front surface 56a that is exposed to the expansion space 28, and a first rear surface 58a that faces the side (that is, displacer rod 34 side) opposite to the first front surface 56a. The first front surface 56a is a side surface (or front surface) of the first platelike component 54a, which is curved in a hemispherical shape or a semi-ellipsoidal sphere shape. The first front surface 56 defines the tip surface of the displacer head 32. The first rear surface 58a is an approximately flat surface. In addition, if necessary, irregularities such as slits may be formed on the first front surface 56a. Irregularities or holes for connecting the first rear surface 58a to the intermediate platelike component may be also formed on the first rear surface 58a.

Hereinafter, three intermediate platelike components are referred to as a second platelike component 54b, a third platelike component 54c, and a fourth platelike component 54d. The second platelike component 54b is disposed on the expansion space 28 side, and the fourth platelike component 54d is disposed on the displacer base portion 50 side. The third platelike component 54c is disposed between the second platelike component 54b and the fourth platelike component 54d.

Each of the second platelike component 54b, the third platelike component 54c, and the fourth platelike component 54d is a solid member which has a disk shape. Each of the second platelike component 54b, the third platelike component 54c, and the fourth platelike component 54d has the same shape as each other.

The outer shape of the second platelike component 54b is defined by a second front surface 56b, a second rear surface 58b, and a second side surface 60b.

The second front surface 56b and the second rear surface 58b are approximately flat surfaces. However, if necessary, irregularities or holes may be also formed on the second front surface 56b and the second rear surface 58b.

A portion of the second front surface 56b comes into contact with the first rear surface 58a of the first platelike component 54a, and the remaining portion of the second front surface 56b does not come into contact with the first rear surface 58a. The working gas layer 62 is formed on the non-contact portion. For example, as shown in FIG. 2, the second front surface 56b includes the outer circumferential portion that comes into contact with the first rear surface 58a of the first platelike component 54a, and a center concave portion that does not come into contact with the first rear surface 58a and faces the first rear surface 58a.

The second side surface 60b is a cylindrical surface. The second side surface 60b defines a portion of a cylindrical side surface of the displacer tip portion 52.

The working gas layer 62 is formed between the center concave portion of the second front surface 56b and the first rear surface 58a. The width (that is, the height of the center concave portion) of the working gas layer 62 in the axial direction is smaller than the thickness of the platelike component in the axial direction. The width of the working gas layer 62 may be smaller than 1/10, 1/50, or 1/100 of the thickness of the second platelike component 54b. The width of the working gas layer 62 may be less than 1 mm, 0.5 mm, or 0.1 mm.

Figure 3:
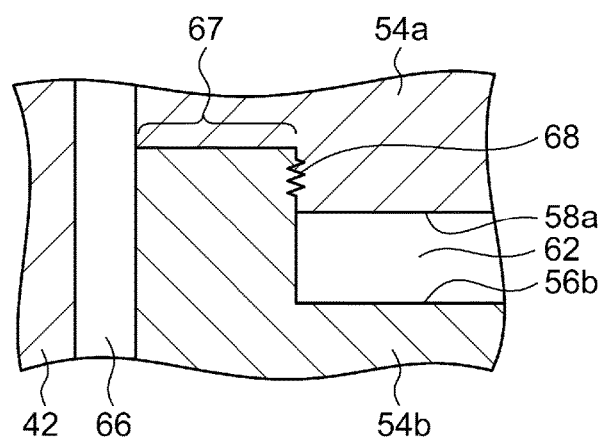
FIG. 3 is a sectional view schematically showing a portion of a displacer of the expander according to an embodiment of the present invention.

A microscopic gap 67 is generated in a contact region between two platelike components adjacent to each other (refer to FIG. 3). The gap 67 is formed between the outer circumferential portion of the second front surface 56b and the first rear surface 58a. The working gas layer 62 is not sealed in an airtight manner with respect to a clearance 66 between the displacer tip portion 52 and the cylinder portion 42, and the expansion space 28. The working gas layer 62 communicates with the clearance 66 through the microscopic gap 67. Since the working gas pressure in the clearance 66 is changed according to the pressure of the expansion space 28, the working gas pressure in the working gas layer 62 is also changed according to the pressure of the expansion space 28.

The third platelike component 54c and the fourth platelike component 54d are configured similar to the second platelike component 54b. The side surface of each of the third platelike component 54c and the fourth platelike component 54d defines a portion of the side surface of the displacer tip portion 52. The second working gas layer 62 is formed between the second platelike component 54b and the third platelike component 54c, and the third working gas layer 62 is formed between the third platelike component 54c and the fourth platelike component 54d. In addition, a second gap is formed between the second platelike component 54b and the third platelike component 54c, and a third gap is formed between the third platelike component 54c and the fourth platelike component 54d. Similar to the above-described gap 67, the gaps cause the working gas layer 62 to communicate with the clearance 66. The rear surface of the fourth platelike component 54d is connected to the front surface of the displacer base portion 50.

The first front surface 56a of the first platelike component 54a faces the low temperature heat exchanger 39 and the cooling stage 29 in a state where the expansion space 28 is interposed therebetween. The second side surface 60b of the second platelike component 54b faces the regenerator 38 in a state where the clearance 66 is interposed therebetween. Similarly, the side surfaces of the third platelike component 54c and the fourth platelike component 54d also face the regenerator 38 in a state where the clearance 66 is interposed therebetween.

A position of a boundary between the first platelike component 54a and the second platelike component 54b in the axial direction is closer to the expansion space 28 relative to a position of a boundary between the regenerator 38 and the low temperature heat exchanger 39 in the axial direction. That is, the first rear surface 58a and the second front surface 56b are surrounded by the low temperature heat exchanger 39. In addition, a boundary between the second platelike component 54b and the third platelike component 54c is surrounded by the regenerator 38. A boundary between the third platelike component 54c and the fourth platelike component 54d is also surrounded by the regenerator 38. A position of a boundary between the fourth platelike component 54d and the displacer base portion 50 in the axial direction corresponds to a position of a boundary between the water cooling type heat exchanger 37 and the regenerator 38 in the axial direction, and is surrounded by the flange 47.

The plurality of platelike components are connected to each other using screw portions (not shown). For example, the plurality of platelike components are connected to each other by long screws penetrating the platelike components. The screw head of each of the long screws may be provided on the displacer base portion 50 side, or may be provided on the first platelike component 54a side.

In addition, the plurality of platelike components are formed of the same resin material. For example, the resin material is polycarbonate. The resin material may be glass fiber reinforced plastic (GFRP). Alternatively, the resin material may be general plastic such as Bakelite.

The first platelike component 54a among the plurality of platelike components is disposed on the lowest temperature side. The second platelike component 54b among the plurality of intermediate platelike components is disposed on the lowest temperature side. The fourth platelike component 54d among the plurality of platelike components is disposed on the highest temperature side.

Accordingly, during the operation of the Stirling cryocooler 10, the fourth platelike component 54d is cooled to a lower temperature than that of the displacer base portion 50. The third platelike component 54c is cooled to a lower temperature than that of the fourth platelike component 54d. The second platelike component 54b and the first platelike component 54a are cooled to a lower temperature than that of the third platelike component 54c.

A displacer of an expander of a typical Stirling cryocooler is configured of a single solid member. The solid member is formed of a metal material. As described above, since the temperature gradient is formed in the displacer and in general, the metal has high thermal conductivity, heat quantity input from the normal temperature portion to the low temperature portion through the displacer is large. The heat loss exerts an adverse effect to refrigeration capacity of the Stirling cryocooler. Accordingly, a displacer of an expander configured of a single hollow member may be adopted. Therefore, the heat input to the low temperature portion due to the heat conduction of the displacer member is suppressed. However, convection of gas in a cavity portion of the hollow member is generated, and the convection generates heat loss. In order to prevent the convection, a method in which a partition plate or a porous body is installed in the cavity portion may be considered. However, even when this method is used, it is not possible to sufficient prevent the convection.

According to the present embodiment, the displacer tip portion 52 is divided into the plurality of platelike components. The plurality of platelike components are laminated to form the displacer tip portion 52. Compared to an integral component, in this divided lamination structure, it is possible to decrease the heat conduction between platelike components adjacent to each other. In addition, since each of the platelike components is a solid member, convection of gas is not generated in the inner portion of the platelike component. Accordingly, it is possible to decrease heat transfer through the displacer 22 in the expander 13 of the Stirling cryocooler 10. Heat loss decreases, and it is possible to improve the refrigeration capacity of the Stirling cryocooler 10.

The plurality of platelike components are formed of a resin material. In general, the resin material has thermal conductivity that is significantly lower than that of a metal material. For example, the thermal conductivity of polycarbonate is 0.2 W/m·K to 0.3 W/m·K. Therefore, compared to the case in which the displacer is formed of a metal material, in the present embodiment, it is possible to improve the refrigeration capacity of the Stirling cryocooler 10.

The working gas layer 62 is formed between the platelike components adjacent to each other. In general, the thermal conductivity of gas is significantly lower than the thermal conductivity of the metal and is lower than the thermal conductivity of the resin material. For example, the thermal conductivity of helium gas in the low temperature portion is approximately 0.15 W/m·K and is lower than the thermal conductivity of the polycarbonate. Accordingly, by forming the working gas layer between the platelike components formed of a resin material, it is possible to further decrease heat transfer through the displacer 22.

In addition, since the width of the working gas layer 62 in the axial direction is sufficiently small, a temperature gradient is not substantially generated in the working gas layer 62. In other words, a rear surface of a platelike component and a front surface of an adjacent platelike component are cooled to substantially the same temperature. Accordingly, convection of the working gas in the working gas layer 62 is substantially prevented.

The plurality of platelike components are connected to each other using screw portions. Accordingly, since it is possible decrease thermal contact between the platelike components, it is possible to decrease the heat transfer through the displacer 22.

The position of the boundary between the first platelike component 54a and the second platelike component 54b in the axial direction is closer to the expansion space 28 relative to the position of the boundary between the regenerator 38 and the low temperature heat exchanger 39 in the axial direction. Accordingly, since the first platelike component 54a and the second platelike component 54b are divided, it is possible to decrease heat input from the first platelike component 54a to the second platelike component 54b. It is possible to decrease heat input from the cooling stage 29 to the boundary region between the low temperature heat exchanger 39 and the regenerator 38 through the displacer tip portion 52.

In addition, the microscopic gap 67 between the platelike components generated due to the division structure is adjacent to the clearance 66 (refer to FIG. 3). Abrasion powder generated due to sliding between the displacer head 32 and the cylinder portion 42 can be received by the gap. Accordingly, it is possible to prevent staying or accumulation of the abrasion power on the sliding surface. Since the abrasion powder changes sliding resistance, the abrasion powder influences the reciprocation of the displacer 22. Accordingly, in the division structure of the displacer 22 according to the present embodiment, stable reciprocation of the displacer 22 is obtained.

Since the displacer base portion 50 and the displacer rod 34 are hollow, it is possible to decrease weight of the displacer 22.

Hereinbefore, the embodiment of the present invention is described. The present invention is not limited to the embodiment, various design modifications can be performed, various modification examples can be performed, and a person skilled in the art understands that the modifications examples are included in the scope of the present invention.

In an embodiment, a first screw portion may be formed in one of two platelike components adjacent to each other, and a second screw portion, which engages with the first screw portion may be formed on the other. As shown in FIG. 3, the first second portion may be formed on the first rear surface 58a of the first platelike component 54a, and a second screw portion may be formed on the second front surface 56b of the second platelike component 54b. In this way, the plurality of platelike components may be connected to each other using a screw portion 68.

In an embodiment, the plurality of platelike components may be formed of different materials. One end or both ends of the displacer tip portion 52 may be formed of a first resin material, and other portions of the displacer tip portion 52 (for example, an intermediate portion in the axial direction) may be formed of a second resin material. A liner expansion coefficient of the first resin material may be smaller than that of the second resin material. The thermal conductivity of the first resin material is higher than that of the second resin material. In a material having a small liner expansion coefficient, it is possible to prevent change of the clearance 66 due to cooling. A material having a small linear expansion coefficient may be used on at least an end portion of the clearance 66. For example, the second platelike component 54b and the fourth platelike component 54d may be formed of GFRP, and the third platelike component 54c may be formed of polycarbonate.

In an embodiment, a reflective surface may be formed on the front surface and/or the rear surface of the platelike component facing the working gas layer 62. A metal coating layer may be formed on the front surface and/or the rear surface of the platelike component. In this way, radiant heat between the platelike components may be decreased.

The position of the boundary between the regenerator 38 and the low temperature heat exchanger 39 in the axial direction may be closer to the expansion space 28 relative to the position of the boundary between the first platelike component 54a and the second platelike component 54b in the axial direction. That is, the first rear surface 58a and the second front surface 56b may be surrounded by the regenerator 38.

In an embodiment, at least one platelike component may be a hollow platelike component. In this case, the working gas or other gas may be sealed in the platelike component. Alternatively, the inner portion of the platelike component may be maintained in a vacuum state.

In an embodiment, at least one platelike component may be formed of a plurality of portions, which are divided into a direction (for example, in the radial direction or the circumferential direction) different from the axial direction.

It should be understood that the invention is not limited to the above-described embodiment, but may be modified into various forms on the basis of the spirit of the invention. Additionally, the modifications are included in the scope of the invention.

What is claimed is:

1. A Stirling-cryocooler expander for connection with a Stirling-cryocooler compressor containing a working gas, the Stirling-cryocooler expander comprising:
    a cylindrical displacer composed of a displacer base portion disposed on a center axis and a displacer tip portion aligned along the center axis, extending from the displacer base portion to a working-gas expansion space, the displacer tip portion including a plurality of discoid components each having a cylindrical lateral surface and a substantially flat rear surface, one discoid component of each of pairs of the discoid components having a substantially flat front surface containing a central recess, the plurality of discoid components being arranged axially adjoining each other rear-surface-to-front-surface along the center axis so that the cylindrical lateral surfaces of the discoid components constitute a portion of the displacer tip portion's outer cylindrical surface, and to bring central-recess-encompassing portions of the axially adjoining rear and front surfaces into contact and leave the central recess where the axially adjoining rear and front surfaces are not in contact as an area forming a working-gas layer with the expander being connected to the Stirling-cryocooler compressor; and
    a regenerator disposed surrounding the displacer tip portion such as to guide reciprocating travel of the displacer along the center axis.

2. The Stirling-cryocooler expander according to claim 1, wherein the plurality of discoid components are formed of a synthetic resin material.

3. The Stirling-cryocooler expander according to claim 1, wherein the plurality of discoid components are connected to each other using threaded portions.

4. The Stirling-cryocooler expander according to claim 1, wherein the working-gas layers depthwise along the center axis are dimensioned smaller than the discoid components are dimensioned depthwise along the center axis.

5. The Stirling-cryocooler expander according to claim 1, wherein the displacer base portion is hollow.

6. The Stirling-cryocooler expander according to claim 1, wherein the discoid components are solid members.

7. The Stirling-cryocooler expander according to claim 1, wherein the working-gas layers are of smaller axial thickness than the discoid components are.

8. The Stirling-cryocooler expander according to claim 1, wherein the working-gas layers are of less than 1 mm axial thickness.

9. The Stirling-cryocooler expander according to claim 1, wherein the discoid components adjoin axially through circumferential micro-gaps fluidly communicating the working-gas layers with a clearance between the regenerator and the displacer tip portion.

10. A Stirling-cryocooler expander for connection with a Stirling-cryocooler a compressor containing a working gas, the Stirling-cryocooler expander comprising:
    an expander main body defining a center axis and containing a working-gas expansion space;
    a cylindrical displacer composed of base and tip portions disposed aligned along the center axis, the displacer tip portion extending from the base portion to the working-gas expansion space and including a semi-ellipsoidal end component and a discoid intermediate component, the semi-ellipsoidal end component having a semi-ellipsoidal tip surface and a substantially flat base surface, and the discoid intermediate component having a cylindrical lateral surface and substantially flat end surfaces, at least one end surface containing a central recess, the semi-ellipsoidal end component and discoid intermediate component being arranged axially adjoining each other base-surface-to-end-surface along the center axis so that the semi-ellipsoidal tip surface of the end component and the cylindrical lateral surface of the discoid component constitute a portion of the displacer tip portion's outer surface, and to bring central-recess-encompassing portions of the axially adjoining base and end surfaces into contact and leave the central recess where the axially adjoining base and end surfaces are not in contact as an area forming a working-gas layer with the expander being connected to the Stirling-cryocooler compressor; and
    a regenerator disposed in the expander main body, partially enclosing the working-gas expansion space.

* * * * *